US010042074B2

(12) United States Patent
Bailey

(10) Patent No.: US 10,042,074 B2
(45) Date of Patent: Aug. 7, 2018

(54) UNDERGROUND UTILITY LINE LOCATOR AND METHOD FOR USE

(71) Applicant: The Charles Machine Works, Inc., Perry, OK (US)

(72) Inventor: Brian K. Bailey, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 364 days.

(21) Appl. No.: 14/729,232

(22) Filed: Jun. 3, 2015

(65) Prior Publication Data
US 2015/0355364 A1    Dec. 10, 2015

Related U.S. Application Data

(60) Provisional application No. 62/008,340, filed on Jun. 5, 2014.

(51) Int. Cl.
G01R 33/04 (2006.01)
G01V 3/165 (2006.01)
G01V 3/08 (2006.01)
G01V 3/15 (2006.01)

(52) U.S. Cl.
CPC ............... *G01V 3/165* (2013.01); *G01V 3/08* (2013.01); *G01V 3/081* (2013.01); *G01V 3/15* (2013.01)

(58) Field of Classification Search
CPC .... G01R 33/04; G01R 33/075; G01R 33/077; G01R 35/005; G01R 33/022; G01R 33/028; G01R 33/032; G01R 33/063; G01R 33/10; G01R 33/1276; G01R 15/202; G01R 17/105

USPC ... 324/326–329, 750.12, 331, 228–263, 529, 324/754.29, 179, 207.25
See application file for complete search history.

(56) References Cited

U.S. PATENT DOCUMENTS

| 5,043,666 | A |   | 8/1991  | Tavernetti et al. |         |
|-----------|---|---|---------|-------------------|---------|
| 5,056,454 | A |   | 10/1991 | Turner            |         |
| 5,231,355 | A |   | 7/1993  | Rider et al.      |         |
| 5,361,029 | A |   | 11/1994 | Rider et al.      |         |
| 5,920,194 | A | * | 7/1999  | Lewis ............ | G01V 3/06 |
|           |   |   |         |                   | 324/326 |
| 6,140,819 | A |   | 10/2000 | Peterman et al.   |         |
| 6,268,731 | B1 | * | 7/2001 | Hopwood .......... | G01V 3/06 |
|           |   |   |         |                   | 324/247 |
| 6,407,550 | B1 |  | 6/2002  | Parakulam et al.  |         |
| 6,776,246 | B1 |  | 8/2004  | Nickel et al.     |         |

(Continued)

FOREIGN PATENT DOCUMENTS

WO    2005050786 A1    9/2005

*Primary Examiner* — Patrick Assouad
*Assistant Examiner* — Taqi Nasir
(74) *Attorney, Agent, or Firm* — Tomlinson McKinstry, P.C.

(57) ABSTRACT

A locator for determining the location of a buried utility line from an offset position. The locator has a top peak antenna, a bottom peak antenna, and a null antenna. The locator is tilted until the null antenna is pointed directly at the utility line with the top and bottom peak antennas disposed in a locating plane that is substantially vertical and perpendicular to the line. The tilt angle of the locator and the direct distance between the locator and the utility is measured. The tilt angle and direct distance are used by the processor to determine the vertical and horizontal distances between the locator and the utility.

33 Claims, 4 Drawing Sheets

(56) References Cited

U.S. PATENT DOCUMENTS

| | | |
|---|---|---|
| 7,009,399 B2 | 3/2006 | Olsson et al. |
| 7,282,920 B2 | 10/2007 | Mizuno |
| 7,403,014 B2 | 7/2008 | Mercer et al. |
| 7,586,307 B2 | 9/2009 | Brune et al. |
| 7,619,516 B2 | 11/2009 | Olsson et al. |
| 7,733,077 B1 | 6/2010 | Merewether et al. |
| 7,834,631 B2 | 11/2010 | Brune et al. |
| 8,125,210 B2 | 2/2012 | Royle et al. |
| 8,264,226 B1 | 9/2012 | Olsson et al. |
| 8,564,295 B2 | 10/2013 | Olsson et al. |
| 2003/0164789 A1* | 9/2003 | Taylor, Jr. ............... G01S 13/88 342/22 |
| 2004/0168358 A1* | 9/2004 | Stump ..................... E02F 5/06 37/348 |
| 2006/0254820 A1* | 11/2006 | Cole ................. E21B 47/02224 175/45 |
| 2007/0288195 A1 | 12/2007 | Waite et al. |
| 2010/0188086 A1* | 7/2010 | Lazar ............... G01R 33/34076 324/318 |
| 2010/0188088 A1 | 7/2010 | Nielsen |
| 2011/0006772 A1* | 1/2011 | Olsson ..................... G01V 3/15 324/326 |
| 2012/0139525 A1* | 6/2012 | Pearson ............... G01R 33/123 324/67 |

\* cited by examiner

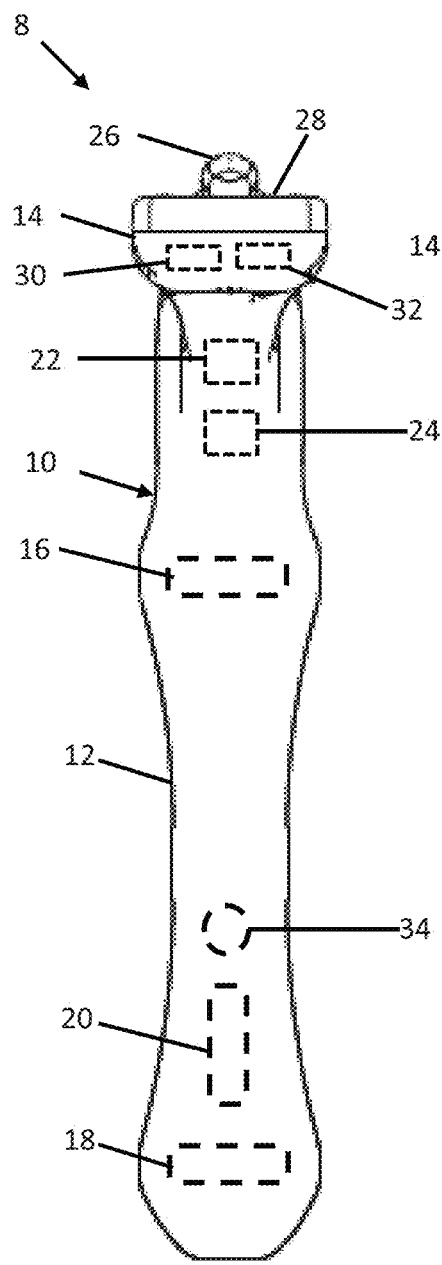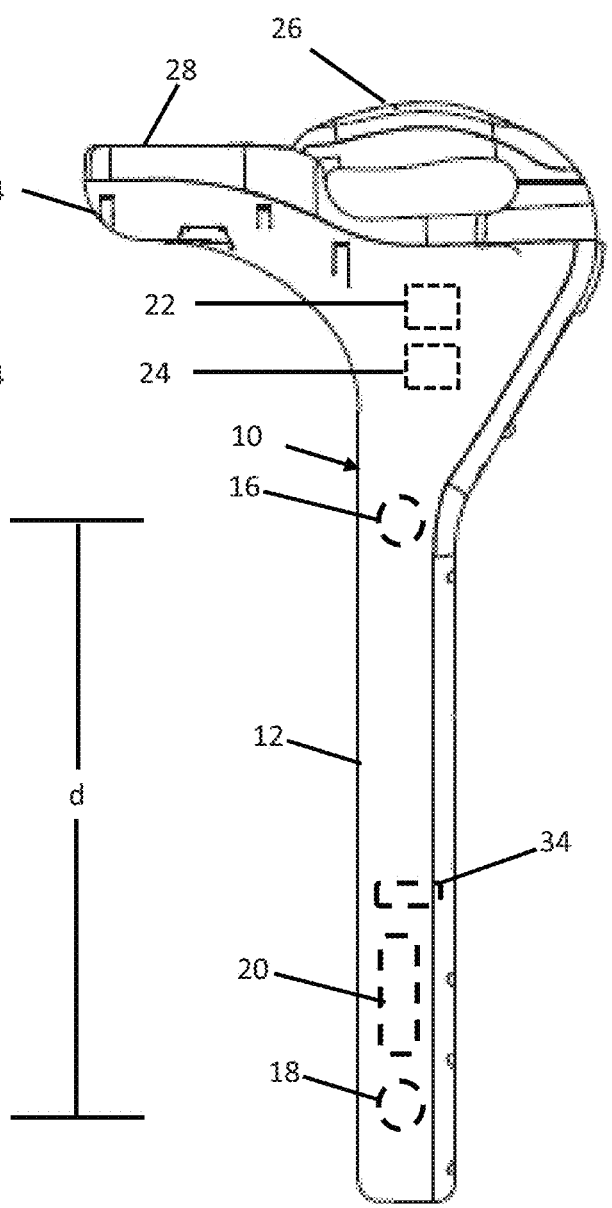
FIG. 1A
FIG. 1B

UNDERGROUND UTILITY LINE LOCATOR AND METHOD FOR USE

CROSS REFERENCE TO RELATED APPLICATIONS

This application claims the benefit of U.S. provisional patent application Ser. No. 62/008,340, filed on Jun. 5, 2014, the entire contents of which are incorporated herein by reference.

FIELD

The present invention relates generally to locating buried utilities with a hand-held locator and specifically to locating a buried utility line that transmits an electromagnetic signal without positioning the locator directly over the line.

SUMMARY

The present invention is directed to a system for locating an underground utility line. The utility line emits an electromagnetic field. The system comprises a hand-held frame having a top and a bottom. A top peak antenna is supported on the frame proximate the top of the frame. A bottom peak antenna is supported proximate the bottom of the frame and separated from the top peak antenna by a known distance. A null antenna is supported on the frame and disposed in an orientation orthogonal to the top peak antenna and the bottom peak antenna. The top peak antenna and the bottom peak antenna are disposed in a locating plane. An inclinometer is supported on the frame to measure a tilt angle of the frame within the locating plane. A processor supported on the frame determines a direct distance between the frame and the underground utility line using signal strength of the electromagnetic field received at the top peak antenna compared to a signal strength received at the bottom peak antenna with the null antenna pointed substantially at the utility line. The processor determines a horizontal distance between the frame and the utility line using the direct distance and the tilt angle of the frame The present invention is also directed to a method for determining the location of an underground utility line using a hand-held locator. The method comprises positioning the locator at a point that is laterally displaced from the utility line and pointing a bottom of the locator toward the utility line by tilting the locator until a minimum signal is measured at a null antenna. A tilt angle of the locator is measured. Signal strength of an electromagnetic field transmitted from the utility line is measured at both a top peak antenna and a bottom peak antenna. The top peak antenna and the bottom peak antenna are separated by a known distance. The measured signal strength of the top peak antenna and the bottom peak antenna are processed to determine a direct distance between the locator and the utility line. A horizontal distance from a point on the frame to the utility line is determined based on the tilt angle of the locator and the direct distance measurement. The horizontal distance is displayed.

The present invention is further directed to a system for determining the location of a utility line that emits an electromagnetic signal and is disposed at least partially under a surface obstruction that prevents placing the locator directly above the utility line. The system comprises a locator, a transmitter, and a processor. The locator comprises a frame having a top and a bottom, a display, a top peak antenna, a bottom peak antenna, a null antenna, and an inclinometer. The top peak antenna is disposed proximate the top of the frame. The bottom peak antenna is disposed proximate the bottom of the frame and separated from the top peak antenna a known distance. The null antenna is supported on the frame orthogonal to the bottom peak antenna. The inclinometer is supported by the frame to detect a tilt angle of the frame. The processor determines a direct distance between the locator and the underground utility line using a signal strength of the electromagnetic field received at the top peak antenna compared to a signal strength received at the bottom peak antenna with the null antenna pointed substantially at the utility line. The processor uses the direct distance and the tilt angle of the frame to calculate a shortest horizontal distance between the locator and a point on the ground above the utility line and within a plane defined by the top peak antenna and the bottom peak antenna. The processor sends a display signal to the display to show the direct distance and the shortest horizontal distance.

The present invention is also directed to a locator for determining the depth and surface location of a utility line while the locator is not directly above the utility line and a null antenna is pointed at the line.

BRIEF DESCRIPTION OF THE DRAWINGS

FIG. 1A is a front view of a locator of the present invention showing the location of peak, null, and compass antennas.

FIG. 1B is a side view of the locator of FIG. 1A.

DESCRIPTION OF THE PREFERRED EMBODIMENT

Figure 2:
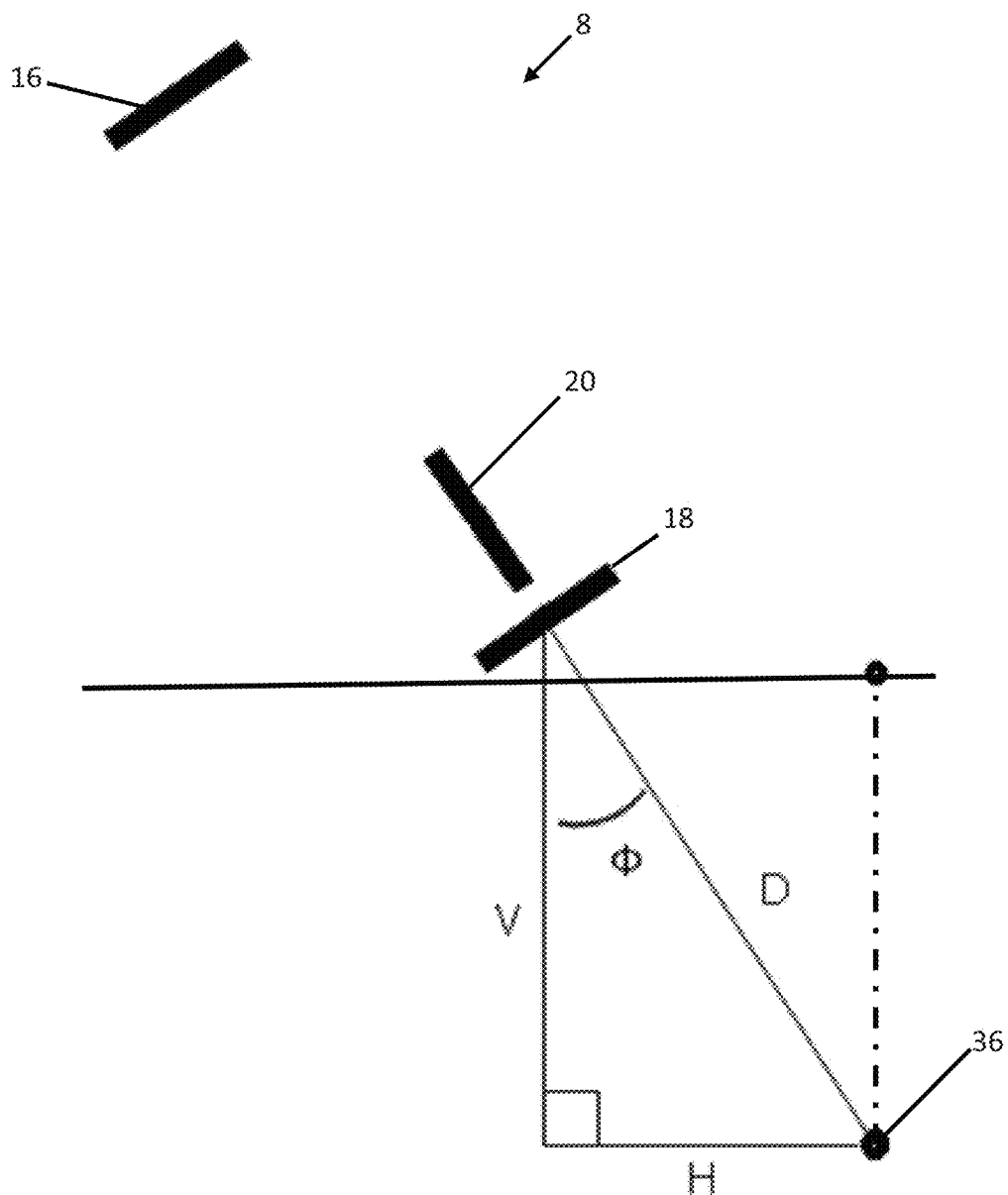
FIG. 2 is a diagrammatic representation of the locator of the present invention used to locate a utility line.

Before beginning underground construction or landscape projects all existing underground utilities such as voice and data lines, gas lines, electric lines and sewer lines should be located by a trained operator of locating equipment. Determining the location of underground utilities prior to beginning a construction or landscape project significantly decreases the likelihood of damaging existing utilities and accidents resulting in injury to people and property. Accordingly, systems have been developed to quickly and efficiently locate buried utilities using above-ground locators. Most such locators use antennas to detect active or passive signals emitted from the buried lines. For example, a transmitter may be coupled to a buried gas line to cause the gas line to emit an electromagnetic field having a circular field shape. A beacon may be placed within a non-conductive utility, such as a PVC pipe, and used with the locator to follow the path of the utility. However, current locating methods require the operator maneuver the locator to a position directly above the buried line to accurately locate the line and estimate the depth of the line. Thus, there is a need for locators that are capable to locating a buried utility line when an obstruction prevents the operator from placing the locator directly over the utility line.

Turning now to the figures, and specifically to FIGS. 1A and 1B there is shown a system for locating an underground utility line that emits an electromagnetic field comprising a locator 8. The locator 8 comprises a hand-held frame 10 having a top and a bottom. As shown in FIGS. 1A and 1B, the frame 10 comprises an elongate or "blade" portion 12 that extends vertically downward from a housing 14. A top peak antenna 16 is supported on the blade portion 12 proximate the top. A bottom peak antenna 18 is supported proximate the bottom of the blade portion 12. The top peak antenna 16 and the bottom peak antenna 18 are supported by the frame 10 in a parallel relationship and separated a known distance "d".

A null antenna 20 is shown disposed between the top peak antenna 16 and the bottom peak antenna 18. The null antenna 20 is disposed in an orientation orthogonal to both the top peak antenna 16 and the bottom peak antenna 18. The null antenna is also supported on the frame 12. The top peak antenna 16, bottom peak antenna 18, and the null antenna are disposed in a single vertical locating plane containing the antennas. Each of the antennas 16, 18 and 20 may comprise a coil-wound ferrite rod commonly used in locators and trackers in the underground construction industry.

An inclinometer 22 and a processor 24 may be supported on the frame 10. The inclinometer 22 may comprise an accelerometer, gyroscope, an optical sensor, or a dead reckoning means used to measure a tilt angle of the locator 8 relative to a reference orientation. In a preferred embodiment the inclinometer may measure the tilt of the locator 8 relative to horizontal to provide a tilt angle as discussed hereinafter.

The processor 24 is programmed to determine a direct distance between the frame and the underground utility line using signal strength of the electromagnetic field received at the top peak antenna compared to a signal strength received at the bottom peak antenna. As described in more detail hereinafter, the processor determines a horizontal distance between the locator 8 and a point on the ground above the utility line and a vertical distance from the point to the utility line using the direct distance from the locator to the line and the tilt angle of the locator.

The housing 14 of the locator may comprise a handle 26 and may house a power source such as batteries (not shown). A display 28 comprising an LCD screen may be supported on the housing 14 and used to communicate locating information to the operator. One embodiment of a display of the present invention will be discussed in detail with reference to FIG. 4.

The locator 8 may also include a global positioned satellite (GPS) receiver 30 and a storage media 32. The GPS receiver 32 may be used to track the spatial location of the locator 8 on the surface as it is moved along a utility during the locating operation. The location information collected by the GPS receiver may be stored on the storage media 32 and used in conjunction with the horizontal distance, vertical distance, and the direct distance to build a map of underground utilities for later reference. The storage media 32 may comprise a conventional hard drive, a flash drive, or other form of electronic storage media.

The locator 8 may further comprise an optional compass antenna 34 that is orthogonal to the null antenna 20, the top peak antenna 16, and the bottom peak antenna 18. The compass antenna may comprise a coil wrapped ferrite rod. Alternatively, the null antenna 20, bottom peak antenna 18, and compass antenna may comprise a support structure comprising three wound coils having a common center-point as disclosed in U.S. Pat. No. 7,786,731, the entire contents of which are incorporated herein by reference. The compass antenna 34 may detect the signal strength of the electromagnetic field emitted from the utility line and transmits a compass signal to the processor 24. In a preferred embodiment, the processor 24 determines the rotational angle of the locator relative to the line using the phase of the field detected by the compass antenna relative to the phase detected by one or both of the top peak antenna 16 and bottom peak antenna 18. The processor 24 uses the compass signal and the signal from either the top peak antenna 16 or the bottom peak antenna 18 to determine an angle between the utility line and the locator in a horizontal plane. As will be discussed with reference to FIG. 3, this feature allows the processor to determine the shortest horizontal distance from a point on the ground above the utility line and the bottom of the locator using the angle between the utility line and the frame in the horizontal plane when the locate plane formed by the top peak antenna 16 and the bottom peak antenna 18 are not perpendicular to the utility line.

Turning now to FIG. 2, a diagrammatic representation of the system of FIG. 1 is shown used to perform an offset locate of a utility line 36. The locator 8 is shown with top peak antenna 16, bottom peak antenna 18, and null antenna 20 all disposed in a common vertical locating plane. The utility line 36 is perpendicular to the locating plane and offset from the bottom peak antenna a horizontal distance "H". The locator 8 is tilted until the longitudinal axis of the null antenna 20 is pointed substantially at the line 36 so that the null antenna measures a null signal. In FIG. 2, the locator is tilted at an angle ϕ to point the null antenna 20 at the line 36. The tilt angle is measured using the inclinometer 32 (FIG. 1A). Tilting the locator 8 also allows the operator to determine the horizontal direction to the line 36. The line lies in the direction opposite the top of the locator when the locator is tilted such that the null antenna measures a null signal. When the null signal is measured a conventional depth measurement is taken using the top peak antenna 16 and the bottom peak antenna 18 to determine a direct distance "D" from the bottom of the frame to the line 36. The direct distance is preferably determined using the equation:

$$\text{Direct Distance} = \frac{(\text{Top} * d)}{(\text{Bot} - \text{Top})}$$

Where "Top" is the top peak antenna signal strength, "Bot" is the bottom peak antenna signal strength and "d" is the vertical distance separation between the top peak antenna 16 and the bottom peak antenna 18. This equation assumes the line 36 is a substantially horizontal long straight conductor with no elbows, tees, or line terminations in the general vicinity of the receiver (the "long line" assumption). The equation also does not take into account noise and return current. It also assumes the top and bottom peak antennas 16 and 18 produce the same signal amplitude when exposed to the same magnetic field. The equation also assumes the null antenna 20 is pointed substantially at the line so that the processor may mimic the conventional locating method which assumes antennas 16 and 18 are directly above the line 36 and the vertical locate plane is disposed perpendicular to the line 36. If these conditions are not satisfied, the direct distance to the line may not be accurately determined. One skilled in the art will appreciate that other methods may be used to determine the direct distance without departing from the spirit of the present invention.

With the system of the present invention the operator may be horizontally offset from the line 36 and still determine the depth of the line and horizontal distance to the line. Using the measured tilt angle ϕ from the inclinometer and the direct distance "D" the processor is programmed to determine the horizontal (H) and vertical distance (V) to the line. The H distance and V distance may be calculated using the following formulas:

$$H = D \sin(\phi)$$

$$V = D \cos(\phi)$$

Figure 3:
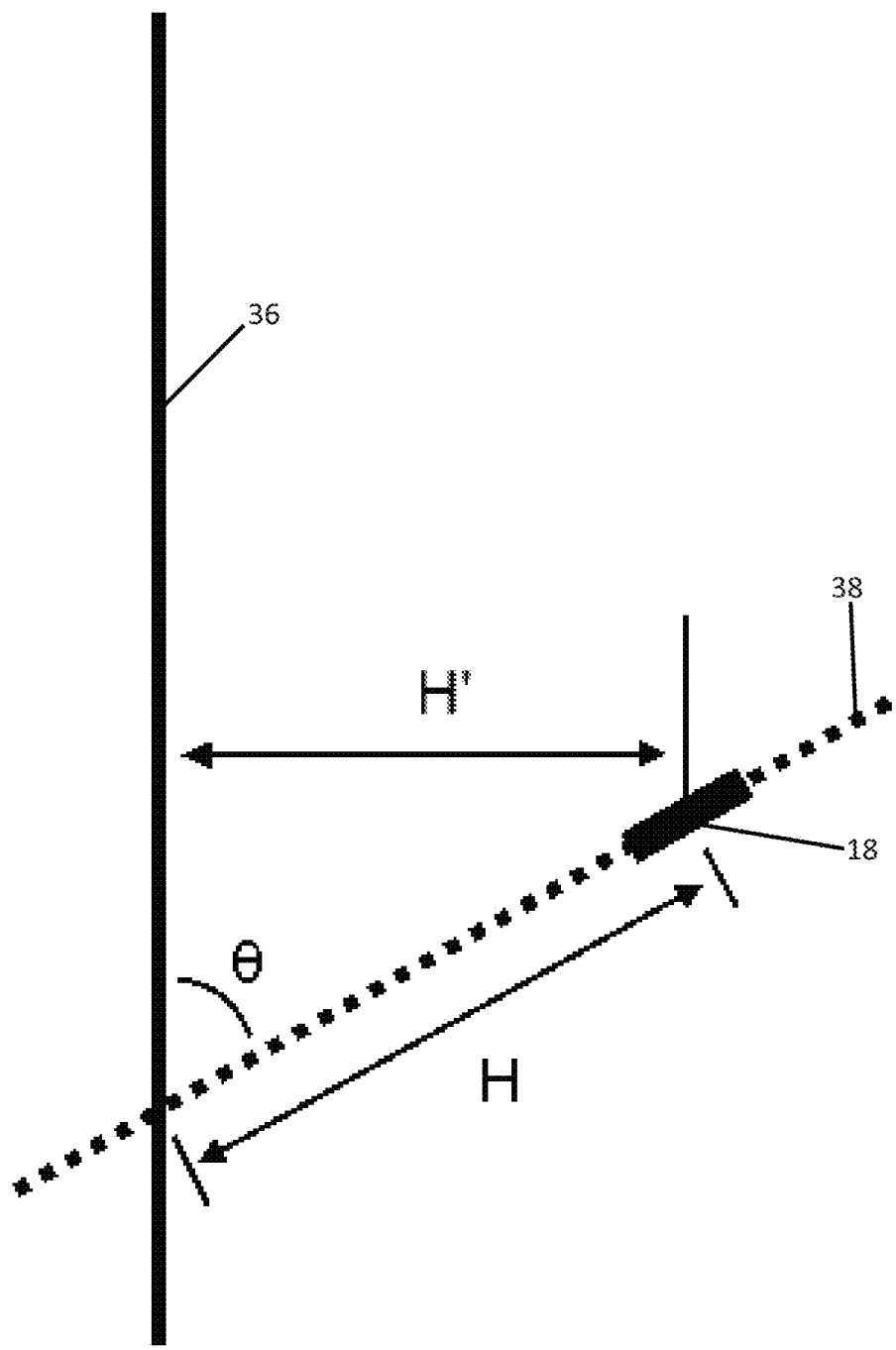
FIG. 3 is a top view of a locating method of the present invention using the locator of FIGS. 1A and 1B.

As shown in FIG. 3, the system of the present invention is adapted to provide the horizontal perpendicular distance (H') from the line 36 to the midpoint of the bottom peak antenna 18 when the locate plane 38 is not perpendicular to the line. The perpendicular horizontal distance is determined using the formula:

$$H' = H \sin(\theta)$$

The θ angle is the angle of the utility line relative to the locate plane 38 or the longitudinal axis of the bottom peak antenna 18, which lies in the locate plane, in the horizontal plane. The angle θ is calculated from the relative phase between the bottom peak antenna 18 and the compass antenna 34. The electromagnetic field measurements at the compass antenna 20 are processed and a visual display may communicate that the locate plane 38 is not perpendicular to the line 36 by display of a compass direction.

Figure 4:
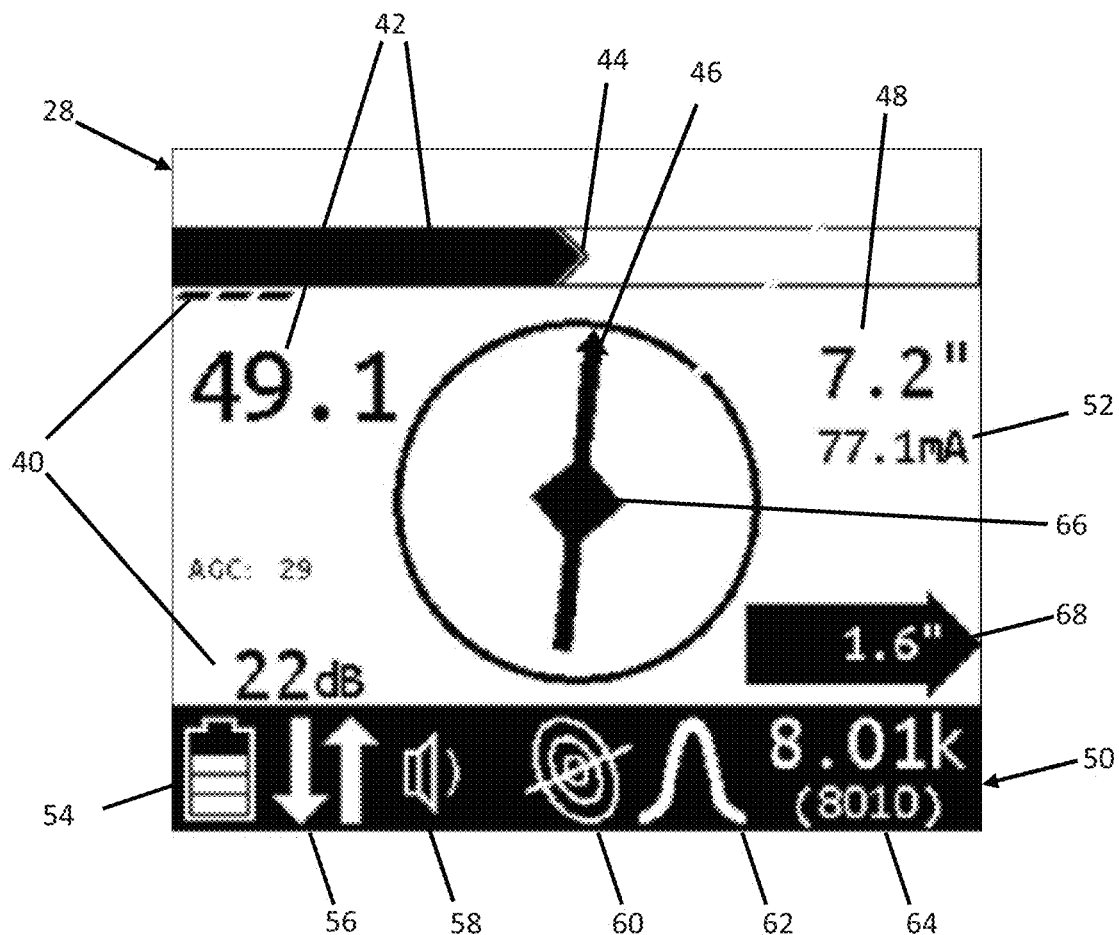
FIG. 4 is a representation of a display screen of the locator of the present invention.

Turning to FIG. 4, a display 28 for use in the system of the present invention is shown. As discussed with regard to FIGS. 1A and 1B, the display 28 may comprise an LCD screen mounted on the housing 14 portion of the locator 8. The display 28 may comprise numerical and visual gain indicators 40, numerical and visual signal strength indicators 42, a peak signal icon 44, a compass icon 46, and an estimated depth reading indicator 48. The signal strength indicators 42 may be used to determine when the locator 8 and therefore the top peak and bottom peak antennas are oriented to receive maximum signal strength. Likewise, the signal strength indicators 42 may be used to determine the presence of a minimum signal when the null antenna 20 is activated and its longitudinal axis is pointed at the line 36. The compass icon 46 provides a visual indication of an orientation of the utility line 36 relative to the locator 8.

The display 26 may also provide a system status bar 50 containing a plurality of status and function icons, and a current meter reading 52. The status bar may provide battery level 54 information, an indication that a direction enable feature is active 56, a volume level indicator 58, a locate mode indicator 60, an active antenna indicator 62, and a selected frequency setting 64.

In accordance with the present invention, a center diamond 66 appears to provide a visual indication that locator 8 has been tilted to an angle such that the null antenna 20 is pointed substantially at the line 36 when attempting to locate the line 36 from an offset location. The estimated horizontal distance between the bottom of the locator 8 and a point on the ground directly above the line 36 and direction to the line is shown by icon 68.

In operation, the hand-held locator 8 may be manually or automatically switched from an over-the-top locate mode to an off-set mode and positioned at a point on the ground that is laterally displaced from the utility line 36. The processor 24 may be programmed to automatically switch the locator 8 to off-set mode when the inclinometer detects the locator has been tilted at an angle equal to or greater than ten degrees (10°). A transmitter (not shown) may be operably connected to the utility line such that an electromagnetic field is emitted from the utility line. Alternatively, the transmitter may cause the line to emit the field by induction. Induction requires positioning the transmitter directly on top of and parallel to the line. A suitable transmitter is the Subsite® UtiliGuard® T12 transmitter sold by The Charles Machine Works, Inc.

Preferably the locator is positioned to orient the locating plane 38 perpendicular to the utility line 36. The locator may be rotated until a minimum signal is measured at the compass antenna to indicate the locating plane, containing the top peak antenna 16 and the bottom peak antenna 18, is perpendicular to the line. Visual indicators on the LCD screen may be used to direct the operator to orient the locator so that the locate plane is substantially perpendicular to the line.

The top of the locator is tilted away from the line until the null antenna 20 is pointed toward the utility line. The operator knows the bottom of the frame and the null antenna are pointed at the line when a minimum signal is measured at the null antenna. At this point, the tilt angle of the locator is measured with the inclinometer. With the locator tilted, the signal strength of the electromagnetic field transmitted from the utility line is measured at the top peak antenna and the bottom peak antenna. The processor receives the measured signal strength of the top peak antenna and the bottom peak antenna and determines the direct distance "D" between the bottom of the locator and the line 36. Using the direct distance "D" and the measured tilt angle the processor determines the horizontal distance "H" and the vertical distance "V" to the utility line. The determined distances are then displayed on the LCD screen with icons 48 and 68.

Various modifications can be made in the design and operation of the present invention without departing from its spirit. Thus, while the principle preferred construction and modes of operation of the invention have been explained in what is now considered to represent its best embodiments, it should be understood that within the scope of the appended claims, the invention may be practiced otherwise than as specifically illustrated and described.

What is claimed is:

1. A system for locating an underground utility line, wherein the utility line emits an electromagnetic field, the system comprising:
   one and only one top antenna supported on the frame proximate the top of the frame, in which the top antenna detects the electromagnetic field on only one axis;
   one and only one bottom antenna supported proximate the bottom of the frame and separated from the top antenna by a known distance, in which the bottom antenna detects the electromagnetic field on only one axis;
   a null antenna supported on the frame and disposed at an orientation orthogonal to the top antenna and the bottom antenna;
   wherein the top antenna and the bottom antenna define a locating plane;
   an inclinometer supported on the frame to measure a tilt angle of the frame within the locating plane; and
   a processor supported on the frame to determine a direct distance between the frame and the underground utility line using a signal strength of the electromagnetic field received at the top antenna compared to a signal strength received at the bottom antenna with the null antenna pointed substantially at the utility line;
   wherein the processor determines a horizontal distance between the frame and a point on the ground above the utility line using the direct distance and the tilt angle of the frame.

2. The system of claim 1 further comprising a display having a visual indicator to guide the frame to a position where the null antenna is pointed substantially at the utility line and to indicate when the frame is pointed substantially at the utility line.

3. The system of claim 2 wherein the display shows a vertical distance; wherein the vertical distance comprises the distance from a point proximate the bottom of the frame to a point on the utility line that intersects the locate plane.

4. The system of claim 2 further comprising:
a global positioning satellite receiver; and
a storage media to store a global position of the frame, the horizontal distance, and the vertical distance.

5. The system of claim 1 wherein the utility line is perpendicular to the locating plane when the direct distance is determined.

6. The system of claim 1 wherein the inclinometer comprises an accelerometer.

7. The system of claim 1 further comprising a compass antenna that is orthogonal to the null antenna, the top antenna, and the bottom antenna.

8. The system of claim 7 wherein the compass antenna detects the signal strength of the electromagnetic field and transmits a compass signal to the processor, wherein the processor uses the compass signal and a signal from the top antenna or the bottom antenna to determine an angle between the utility line and the frame in a horizontal plane.

9. The system of claim 8 wherein when the locate plane is not perpendicular to the utility line a shortest horizontal distance from a point on the ground above the utility line and the bottom of the frame is determined by the processor using the angle between the utility line and the frame in the horizontal plane.

10. The system of claim 2 wherein the display comprises a visual indication of an orientation of the utility line relative to the frame.

11. The system of claim 1 wherein the null antenna is disposed in the locating plane.

12. A method for determining the location of an underground utility line using a hand-held locator, the method comprising:
positioning the locator at a point that is laterally displaced from the utility line;
pointing a bottom of the locator toward the utility line by tilting the locator until a minimum signal is measured at a null antenna;
measuring a tilt angle of the locator;
measuring a signal strength of an electromagnetic field transmitted from the utility line at one and only one top antenna and at one and only one bottom antenna, wherein the top antenna and the bottom antenna are separated by a known distance, and wherein the top antenna and the bottom antenna each detect the electromagnetic field on only one axis;
processing the measured signal strength of the top antenna and the bottom antenna to determine a direct distance between the locator and the utility line;
determining a horizontal distance to the utility line based on the tilt angle of the locator and the direct distance; and
displaying the horizontal distance.

13. The method of claim 12 further comprising rotating the locator to orient the locator so that the locate plane is substantially perpendicular to the line.

14. The method of claim 12 further comprising following visual indicators displayed on a screen to locate a peak-null signal with the bottom and null antennas.

15. The method of claim 12 further comprising determining a global position of the locator using a global positioning satellite receiver and storing the direct distance, the vertical distance, and the horizontal distance.

16. The method of claim 12 further comprising determining a vertical distance to the utility line based on the tilt angle of the locator and the direct distance and displaying the vertical distance.

17. A system for determining the location of a utility line that emits an electromagnetic field, the utility line being disposed at least partially under a surface obstruction that prevents placing the locator directly above the utility line, the system comprising:
a locator comprising:
a frame having a top and a bottom;
a display;
one and only one top antenna disposed proximate the top of the frame, in which the top antenna detects the electromagnetic field on only one axis;
one and only one bottom antenna disposed proximate the bottom of the frame and separated from the top antenna a known distance, in which the bottom antenna detects the electromagnetic field on only one axis;
a null antenna supported on the frame orthogonal to the bottom antenna;
an inclinometer supported by the frame to detect a tilt angle of the frame;
a processor to determine a direct distance between the locator and the underground utility line using a signal strength of the electromagnetic field received at the top antenna compared to a signal strength received at the bottom antenna with the null antenna pointed substantially at the utility line;
wherein the processor uses the direct distance and the tilt angle of the frame to calculate a shortest horizontal distance between the locator and a point on the ground above the utility line and within a plane defined by the top antenna and the bottom antenna; and
wherein the processor sends a display signal to the display to show the direct distance and the shortest horizontal distance.

18. The system of claim 17 wherein the display comprises a visual indicator to direct movement of the frame to a position where the null antenna is pointed substantially at the utility line.

19. The system of claim 17 further comprising:
a global positioning satellite receiver; and
a storage media to store a global position of the locator, the horizontal distance, and the vertical distance.

20. The system of claim 17 wherein the top antenna, the bottom antenna, and null antenna are disposed in a single plane, wherein the utility line is perpendicular to the plane when the direct distance is determined.

21. The system of claim 17 wherein the top antenna, the bottom antenna, and null antenna are disposed in a single plane, wherein the utility line is disposed at an angle to the plane of greater than or less than 90 degrees when the direct distance is determined.

22. The system of claim 17 wherein the inclinometer comprises an accelerometer.

23. The system of claim 17 wherein the display comprises a visual indication of an orientation of the utility line relative to the frame.

24. The system of claim 17 in which the top antenna and the bottom antenna are each peak antennas.

25. A locator for determining the depth of and location on the surface above a utility line while the locator is not directly above the utility line and a null antenna is pointed at the line, in which the locator comprises one and only one top antenna and one and only one bottom antenna, and in which the top antenna and the bottom antenna each detect an electromagnetic field emitted from the utility line on only one axis.

26. The locator of claim 25 in which the top antenna and the bottom antenna are separated a known distance.

27. The locator of claim 25 further comprising a display to show a user an orientation, a horizontal distance, and the depth of the utility line.

28. The locator of claim 25 further comprising an inclinometer to measure a tilt angle of the locator when the null antenna is pointed at the line.

29. The system of claim 1 in which the top antenna arid the bottom antenna are each peak antennas.

30. The method of claim 12 further comprising using a peak antenna as the top antenna and using a peak antenna as the bottom antenna.

31. The locator of claim 25 in which the top antenna and the bottom antenna are each peak antennas.

32. A system for locating an underground utility line, wherein the utility line emits an electromagnetic field, the system comprising:
  one and only one top antenna supported on the frame proximate the top of the frame, in which the top antenna is a peak antenna;
  a bottom antenna supported proximate the bottom of the frame and separated from the top antenna by a known distance, in which the bottom antenna is a peak antenna;
  a null antenna supported on the frame and disposed at an orientation orthogonal to the top antenna and the bottom antenna;
  wherein the top antenna and the bottom antenna define a locating plane;
  an inclinometer supported on the frame to measure a tilt angle of the frame within the locating plane; and
  a processor supported on the frame to determine a direct distance between the frame and the underground utility line using a signal strength of the electromagnetic field received at the top antenna compared to a signal strength received at the bottom antenna with the null antenna pointed substantially at the utility line;
  wherein the processor determines a horizontal distance between the frame and a point on the ground above the utility line using the direct distance and the tilt angle of the frame.

33. A method for determining the location of an underground utility line using a hand-held locator, the method comprising:
  positioning the locator at a point that is laterally displaced from the utility line;
  pointing a bottom of the locator toward the utility line by tilting the locator until a maximum signal is measured at one and only one top antenna or at a bottom antenna, in which the top and the bottom antennas are separated by a known distance and are each peak antennas;
  measuring a tilt angle of the locator;
  measuring a signal strength of an electromagnetic field transmitted from the utility line at the top and at the bottom antenna;
  processing the measured signal strength of the top antenna and the bottom antenna to determine a direct distance between the locator and the utility line;
  determining a horizontal distance to the utility line based on the tilt angle of the locator and the direct distance; and
  displaying the horizontal distance.

* * * * *

UNITED STATES PATENT AND TRADEMARK OFFICE
CERTIFICATE OF CORRECTION

PATENT NO.         : 10,042,074 B2
APPLICATION NO.    : 14/729232
DATED              : August 7, 2018
INVENTOR(S)        : Bailey Page 1 of 1

It is certified that error appears in the above-identified patent and that said Letters Patent is hereby corrected as shown below:

In the Claims

Column 9, Line 14, please delete "arid" and substitute therefore "and".

Signed and Sealed this
Sixth Day of November, 2018

Andrei Iancu
*Director of the United States Patent and Trademark Office*